J. POSTMA.
DEVICE FOR THE STRAINING AND CANNING OF MILK AND THE LIKE.
APPLICATION FILED JAN. 26, 1920.
1,403,108. Patented Jan. 10, 1922.
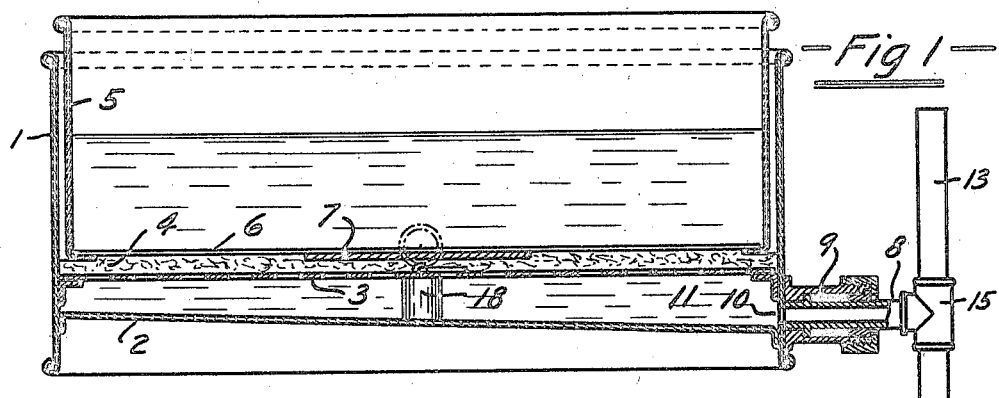
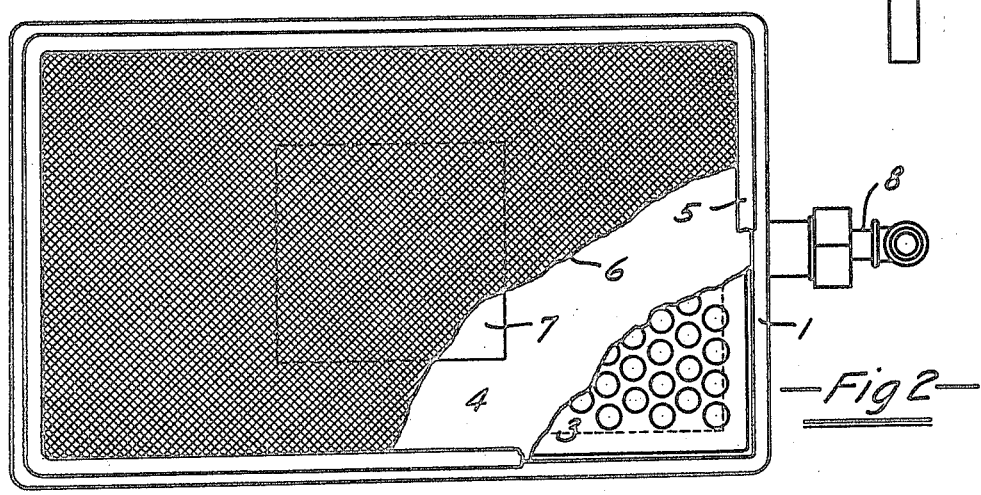
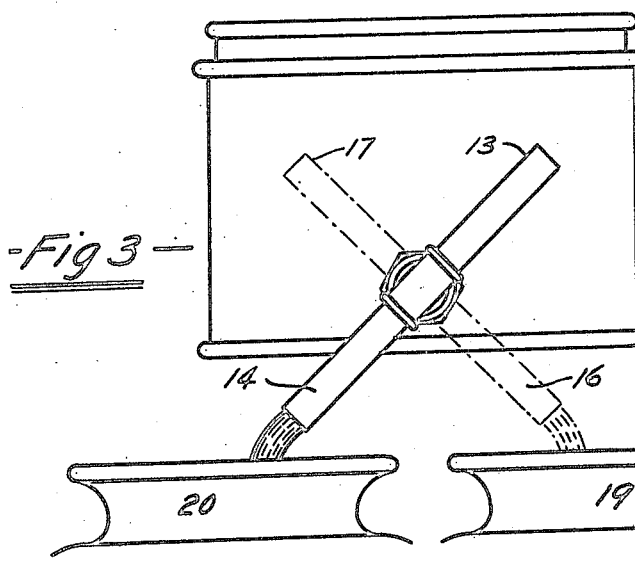
INVENTOR
John Postma
BY
Miller & Henry
ATTORNEYS

UNITED STATES PATENT OFFICE.

JOHN POSTMA, OF LOLETA, CALIFORNIA.

DEVICE FOR THE STRAINING AND CANNING OF MILK AND THE LIKE.

1,403,108.  Specification of Letters Patent.  Patented Jan. 10, 1922.

Application filed January 26, 1920. Serial No. 354,082.

*To all whom it may concern:*

Be it known that I, JOHN POSTMA, a subject of Great Britain, and a resident of Loleta, county of Humboldt, and State of California, have invented new and useful Improvements in Devices for the Straining and Canning of Milk and the like, of which the following is a specification.

My invention has for its object the provision of a strainer which will secure the sanitary and rapid straining of liquids and especially those to be placed immediately in containers, and is particularly applicable to the straining and canning of milk for distribution from dairies.

By referring to the accompanying drawings my invention will be made clear.

Fig. 1 is a cross section through a preferred form of my strainer.

Fig. 2 is a plan view of Fig. 1.

Fig. 3 is an end view of Fig. 1.

Throughout the figures similar numerals refer to identical parts.

A container casing is shown at 1, having a bottom 2, within which I mount a perforated partition 3, adapted to support the filter material 4. At 5 is shown a frame having a screened bottom 6, the said screen preferably being provided with a blank receiving plate 7, at or about the center, for the purpose of receiving the impact of liquid poured thereon. The bottom 2 is preferably made sloping to the outlet spout 8, which latter is carried through the packing gland 9, and communicates through the opening 10 with the space 11 within which the filtered liquid falls or is received.

The pipe 8 passing through the packing gland 9 is provided with branch outlets 13, 14, through the T 15, and is constructed and adapted to rotate with the pipe 12 to the two positions 14 and 16 respectively of Fig. 3. The said rotation is from the position 13, 14, bringing the outlet 13 into the position 16 and the outlet 14 raising at the same time into inoperative position 17, and vice versa.

The filter 4 may be made of any well known material, such as cloth, absorbent cotton, mineral wool, or the like, and the screen 6 retains the said material in place on the supporting and perforated bottom 3. At 18 I have shown a center support, which it is advisable to use where the size of the bottom 3 is large, or where it is made of comparatively light material. The tops of the cans for receiving the filtered material are shown at 19 and 20 respectively.

The operation is as follows:

Assuming that my filter is to be used in a dairy for the purpose of filtering milk preparatory to its being shipped in cans, the milk which is brought direct from the cows is poured into the filter, and impacts upon the plate 7, spreading thence through the filter screen 6, where the heavy or coarse foreign particles, as straw, if any, finds lodgment, and the milk passes thence through the fine filter bed 4, and thence through the perforations of the bottom plate 3 into the compartment 11. From here it passes outward through the outlet pipe 14, until the can 20 is filled to the desired point, when the outlet 13 is to be quickly depressed to the position 16, and the continuously filtering liquid will then flow into the can 19. Can 20 is now to be removed and an empty can substituted therefor. When the can 19 is filled to the desired degree, the outlet 13 is raised from its position 16, and the outlet 14 at the same time will rotate into position for the purpose of filling the substituted empty can.

I claim—

1. A strainer for milk and the like, consisting of a casing having a perforated horizontal partition, filter material disposed on said partition, a screen covering said material, a bottom below said partition and an outlet, and a distributing spout rotatably connected with said opening whereby the strained substance may be distributed to a plurality of containers by rotating said spout, and a baffle plate above the filter material and adapted to receive the impact of the material to be filtered and protect the filter material therefrom, substantially as and for the purpose set forth.

2. A strainer for milk and the like, consisting of a casing having a perforated horizontal partition, filter material disposed on said partition, a screen covering said material, a bottom below said partition and an outlet, and a distributing spout rotatably connected with said opening whereby the strained substance may be distributed to a plurality of containers by rotating said spout, a frame within which the said screen is mounted as a bottom and which telescopes within the casing, and a baffle plate above the filter material adapted to receive the impact of the material to be filtered and protect the filter material therefrom, substantially as and for the purpose set forth.

In testimony whereof, I have hereunto set my hand at Loleta, California, this 10th day of January, 1920.

JOHN POSTMA.

In presence of—
R. O. Dickson.